(No Model.)
T. A. EDISON.
SYSTEM OF ELECTRICAL DISTRIBUTION.
No. 280,727. Patented July 3, 1883.
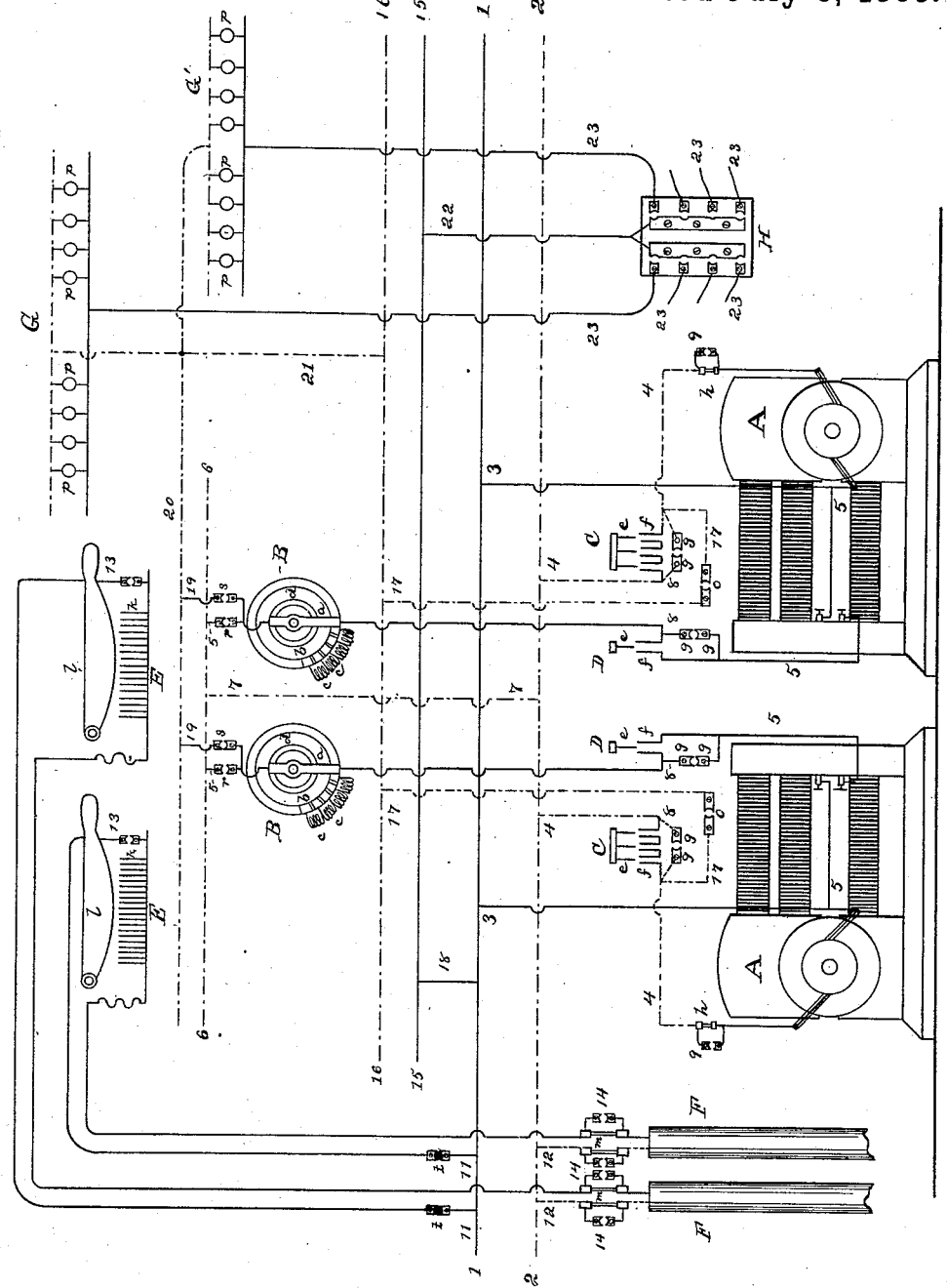
ATTEST:
E. C. Rowlands
Henry W. Seely
INVENTOR:
Thomas A. Edison
By Rich'd N. Dyer,
Atty.

United States Patent Office.

THOMAS A. EDISON, OF MENLO PARK, NEW JERSEY, ASSIGNOR TO THE EDISON ELECTRIC LIGHT COMPANY, OF NEW YORK, N. Y.

SYSTEM OF ELECTRICAL DISTRIBUTION.

SPECIFICATION forming part of Letters Patent No. 280,727, dated July 3, 1883.

Application filed March 16, 1883. (No model.)

*To all whom it may concern:*

Be it known that I, THOMAS A. EDISON, of Menlo Park, in the county of Middlesex and State of New Jersey, have invented a new and useful Improvement in Systems of Electrical Distribution, (Case No. 544,) of which the following is a specification.

In my system of electrical distribution I employ at a central station several dynamo-electric machines for generating current, which is then conveyed by feeding-conductors to the circuits which contain the translating devices of the district.

My invention relates to the arrangement of the various devices and apparatus at such central stations, having for its object, principally, the maintaining of a constant electro-motive force throughout the system, and also to promote the general efficiency and economy of the system.

In carrying out my invention I connect the two or more generators employed in multiple arc from the same main conductors, each armature and each field-magnet being in its own separate multiple-arc circuit. In connection with each machine I preferably employ a single circuit-controller of such form that it will break both the field and the armature circuit by the same movement, and the latter somewhat in advance of the former, for if the field-circuit were broken before the armature-circuit, the main conductors would be short-circuited and the armature burned out. Separate circuit-controllers might, however, be employed, care being taken to always break the armature-circuit before the field. In each field-circuit is placed an adjustable resistance of suitable construction. The feeding-conductors, which convey the current to the incandescent electric lamps or other translating devices of the system, are connected in multiple arc to the main conductors. Each feeding-circuit contains an adjustable resistance, and may be provided with a suitable circuit-controller. Within the station are provided, also, a large number of electric lamps, which are thrown into circuit whenever an additional generator is connected to the main conductors to compensate for such addition in the translating devices without the station, in order to prevent such a sudden accession of current in the district as cannot be readily compensated for by the field-resistances. This is accomplished as follows: When the generator is to be connected, instead of connecting its armature at once to the main conductors, it is connected with other conductors, from which multiple-arc connections are made to the lamps within the station, which are commonly termed "testing-lamps." These lamps are divided into groups, and a switch-board is provided by which more or less of these groups may be placed in circuit. As many lamps are first included as are being supplied in the district by each of the machines already in circuit. The armature-circuit to the main conductors is then also closed, which makes the testing-lamps a part of the circuit supplied by all the generators. The throwing in of the additional generator, therefore, produces no material effect on the current in the translating devices without the station, and any slight change in electro-motive force is compensated for by adjusting the field-circuit resistance. The testing-lamps are then gradually plugged out at the switch-board, the regulating-resistances being constantly adjusted to maintain a constant electro-motive force. The testing-lamps can, however, be used also for testing the efficiency of the generators. To accomplish this the field and armature circuits of each generator can be disconnected from the main conductors of the system and connected to the main testing-circuit. By means of the switch-board a greater or less number of the testing-lamps may be placed in circuit. The armature-circuit of each machine contains a safety-catch of the proper size to prevent injury to the armature. Each feeding-conductor also contains such a safety-catch, and around each safety-catch is a shunt, which may be closed by the insertion of a plug, if the safety-catch is destroyed, to maintain circuit while such safety-catch is replaced. Around each armature and field-circuit controller is placed a similar shunt, which is closed by a plug after the circuit is closed, to prevent heating at the contacts of the circuit-controller.

My invention is illustrated in the accompanying drawing, which is a diagram of the circuits and apparatus at a central station.

A A are dynamo-electric machines. Preferably each of said machines is driven by a steam-engine, the armature being revolved directly by the shaft of the engine without the use of belts or other gearing, and the engine and generator being both mounted on the same bed-plate. From the commutator-brushes of each machine a circuit, 3 4, leads, which is connected to the main conductors 1 2. A conductor, 5, connected to armature-circuit conductor 3, includes the field-magnet coils of the machine, and thence extends to the adjustable resistance B. This resistance is preferably of the form shown in my application No. 540, (Serial No. 82,565.) The end of arm $a$ rests on a circle of contact-plates, $b$, (only a portion of which are shown,) which are connected to resistance-coils $c$ $c$, and the revolution of said arm throws such coils in or out of circuit. Such arm bears constantly on a metal ring, $d$, from which the conductor 5 runs to a conductor, 6. A single conductor, 7, runs from wire 6 to main conductor 2, forming a common return for the field-circuits of both or all the generators.

Preferably means are provided whereby all the resistances B may be simultaneously adjusted, as set forth in my application last referred to. The resistances are to regulate the electro-motive force of the machines according to the whole number of translating devices in circuit in the system.

In each armature-circuit is placed a circuit-controller, C, and in each field-circuit a circuit-controller, D, the circuits being opened and closed by the withdrawal or entrance of contacts $e$ between contacts $f$. Preferably the circuit-controllers C and D of a machine are operated by the same movement, circuit being broken somewhat sooner and closed somewhat later at C than at D, the moving contacts of both being attached to the same pivoted arm, as set forth in my application No. 543, (Serial No. 88,355.) Around each circuit-controller is a shunt, 8, broken at contacts $g$ $g$. These shunts are to be closed by the insertion of guard-plugs when the circuits are closed at C D, to prevent heating of the latter contacts. Each armature-circuit contains, also, a safety-catch, $h$, to prevent injury to the armature by an excessive reduction of resistance of the external circuit, and around each safety-catch is a guard-plug shunt, 9, by which the circuit may be completed while the safety-catch is replaced.

To the main conductors 1 2 are connected feeding-conductors 11 12, by which current is conveyed to the different parts of the district supplied from the station. A conductor, 11, of each feeding-circuit includes an adjustable resistance, E. This resistance is preferably like that shown in the joint application of Charles L. Clarke and myself, (Serial No. 74,778.) The conductor 11 is broken, and the two parts lie parallel with each other. On one side are attached a number of carbon rods $k$, and the metal blade $l$ is in sliding contact with the other side. When such blade is pressed down, it places more or less of the carbon rods in multiple arc across the break, and so decreases or increases the resistance of the circuit. These resistances are to regulate the current in the feeders for variations in the number of translating devices in the part of the district contiguous to the terminals of each feeder. A guard-plug shunt, 13, is formed around each resistance, so that circuit may be completed if it is desired to dispense with such resistances. Each feeding-circuit is provided with a plug, $t$, for opening and closing the circuit. This, however, may be dispensed with, and the circuits made and broken by inserting and removing the safety-catches and guard-plugs. Each feeding-circuit leaves the station inclosed in a tube, F. In each feeding-conductor is a safety-catch, $m$, and around each safety-catch is a guard-plug shunt, 14, for the purpose above explained.

The testing-lamps are represented by $p$ $p$. 15 16 are the main testing-conductors. To connect the armature of a generator to this circuit, the circuit-controller C and shunt 8 are opened, and shunt 17 is closed by inserting a plug at $o$. This connects conductor 4 to 16, instead of to 2, and, as conductor 15 is already connected to conductor 1 by conductor 18, the armature-circuit is thus connected to the main testing-circuit. To connect the field of a generator, conductor 5 is broken at $r$ and conductor 19 closed at $s$, making connection to conductor 20, from which conductor 21 runs to main testing-conductor 16. The lamps $p$ are divided into groups, each of a suitable number. Two of such groups, G and G', are shown. From conductor 15 a wire, 22, runs to a switch-board, H, and from the opposite terminals of the switch-board wires 23 run, one to a conductor of each group of lamps. The opposite conductor of each group is connected through conductor 21 to conductor 16. Each group of lamps is connected in circuit by the insertion of a plug between the proper terminals of the switch-board. Thus any desired load may be put upon a generator, whereby its capacity and efficiency may be tested. The main object of the testing-lamps—that is, to compensate in the translating devices of the system without the station when an additional generator is placed in circuit to prevent a sudden increase in electro-motive force by such addition—is, however, accomplished as follows: When such an increase of lamps is expected in the district as will require the addition of a generator to those already in circuit, as many groups of lamps $p$ are connected by means of the switch-board H to the main testing-circuit 15 16 as are supplied by each of the already connected generators. The field-circuit of the generator is closed by the insertion of a plug in the shunt 8 around the circuit-controller D, the plugs being also inserted at r and s. The shunt 17 is then closed at o, which connects the generator with all the testing-lamps connected at the switch-board. The circuit-controller C is then closed, which connects both the lamps and the generator to the main circuit. The proportion of generators and lamps throughout the entire system thus remains the same or nearly the same, any slight difference being adjusted by regulating the resistances B B. The groups G of testing-lamps are then cut out of circuit at the switch-board, one after another, and the field-resistances are adjusted so that a constant electro-motive force is maintained.

By the use of the regulating means described—first, means situated within the station for compensating in the translating devices without the station for the addition of a generator to the main circuit; second, the adjustable resistances in the field-circuits for adjusting the gradual variations which occur in the total number of lamps in circuit; and, third, the adjustable resistances in the feeding-circuits, forming regulators for variations at the different centers of consumption—I am enabled to maintain a practically-constant electro-motive force throughout the system under all circumstances, and, in addition, I may, if desired, regulate the entire system by the connection and disconnection of feeders.

It is to be understood that all patentable features of invention described or shown, but not claimed herein, are reserved for protection by other patents, and have been or will be embraced in other applications for patents.

What I claim is—

1. In a system of electrical distribution, means situated within the central station for compensating in the translating devices without the station for the increased electro-motive force caused by the addition of a generator to those already in circuit, substantially as set forth.

2. In a system of electrical distribution, the combination of two or more generators, the main circuit, means for separately connecting said generators thereto, the circuit containing the testing or compensating lamps, and means for separately connecting the generators to said circuit, substantially as set forth.

3. In a system of electrical distribution, the combination of the two or more generators, the main circuit, means for separately connecting said generators to said main circuit, the circuit containing the testing or compensating lamps, means for separately connecting the generators thereto, and means for connecting the main circuit with the testing or compensating lamp-circuit, substantially as set forth.

4. In a system of electrical distribution, the combination of the two or more generators, each having its field and its armature in a separate multiple-arc circuit from the main conductors, of means for disconnecting the armature-circuit alone or both the field and armature from said main conductors and connecting them instead to a circuit containing testing or compensating lamps, substantially as set forth.

5. The testing or compensating lamps arranged in groups, in combination with means for placing more or less of such groups in connection with the generators, substantially as set forth.

6. The combination, with the testing or compensating lamps arranged to be gradually thrown out of circuit, of the adjustable resistances in the field-circuits of the generators, for compensating for the variations in electro-motive force, substantially as set forth.

7. In a system of electrical distribution, the combination of the testing or compensating lamps, the adjustable resistances in the field-circuits of the generators, and the adjustable resistances in the feeding-circuits, whereby a constant electro-motive force is maintained throughout the system, substantially as set forth.

8. In a system of electrical distribution, the combination of the adjustable resistances in the field-circuits of the generators, and the adjustable resistances in the feeding-circuits, substantially as set forth.

9. The method of maintaining a constant electro-motive force in a system of electrical distribution employing two or more generators when an additional generator is placed in circuit, consisting in first connecting said generator with a number of lamps not connected with the rest of the system, and then connecting it also with the main circuit of the system, whereby the proportion of lamps and generators remains the same, substantially as set forth.

10. The method of maintaining a constant electro-motive force in a system of electrical distribution employing two or more generators when an additional generator is placed in circuit, consisting in first connecting said generator with a number of lamps not connected with the rest of the system, then connecting it also with the main circuit of the system, and then gradually removing said lamps, at the same time regulating the adjustable resistances in the field-circuits of the generators, substantially as set forth.

This specification signed and witnessed this 13th day of February, 1883.

THOS. A. EDISON.

Witnesses:
H. W. SEELY,
EDWARD H. PYATT.